United States Patent [19]

Lu

[11] Patent Number: 4,740,433

[45] Date of Patent: Apr. 26, 1988

[54] NONAQUEOUS BATTERY WITH SPECIAL SEPARATOR

[75] Inventor: Wen-Tong P. Lu, Bridgewater, N.J.

[73] Assignee: American Telephone and Telegraph Co., AT&T Bell Laboratories, Murray Hill, N.J.

[21] Appl. No.: 912,980

[22] Filed: Sep. 29, 1986

[51] Int. Cl.$^4$ .................... H01M 4/78; H01M 2/16
[52] U.S. Cl. ................................. 429/94; 429/194; 429/197; 429/254
[58] Field of Search ................. 429/197, 254, 94, 194

[56] References Cited

U.S. PATENT DOCUMENTS

| | | | |
|---|---|---|---|
| 3,864,167 | 2/1975 | Broadhead | 429/194 |
| 4,201,641 | 5/1980 | Gotoda et al. | 204/159.17 |
| 4,206,275 | 6/1980 | Bernstein et al. | 429/206 |
| 4,287,275 | 9/1981 | Davis | 429/206 |
| 4,414,090 | 11/1983 | D'Agostino et al. | 204/252 |
| 4,629,666 | 12/1986 | Schlaikjer | 429/194 |

OTHER PUBLICATIONS

"Ethylene Carbonate-Ether Mixed Solvents Electrolyte for Lithium Batteries", *Electrochimica Acta*, 29, 1984, No. 10, pp. 1471-1476, S. I. Tobishima et al.

"Ethylene Carbonate-Propylene Carbonate Mixed Electrolytes for Lithium Batteries", *Electrochimica Acta*, 29, No. 2, pp. 267-271, S. I. Tobishima et al.

"Nonaqueous Batteries with LiClO$_4$-Ethylene Carbonate as Electrolyte", *J. of the Electrochemical Society*, vol. 118, No. 1, Jan. 1971, pp. 153-158, Gianfranco Pistoia.

"Preparation of Graft Copolymers with the Aid of Ionizing Radiations", *High Polymers*, vol. XV, pp. 596-691, Adolphe Chapiro (Interscience Publishers, New York, 1962.

"Modifying Membrane Properties to Meet Industrial Needs", *Electrochemical Society Extended Abstracts*, vol. 80-2, Hollywood, Fla., Oct. 5-10, 1980, pp. 1535-1536, V. D'Agostino et al.

"Novel Hybrid Separators for Alkaline Zinc Batteries", *Proceedings of the Symposium on Advances in Battery Materials and Processes*, vol. 84-4, pp. 206-217, R. S. Yeo and J. Lee, published by The Electrochemical Society, Inc.

*Primary Examiner*—Aaron Weisstuch
*Attorney, Agent, or Firm*—Walter G. Nilsen

[57] ABSTRACT

Lithium nonaqueous rechargeable batteries are described in which the separators in the cells have been exposed to a radiation grafting process to increase wettability. This increases charging and discharging rates without use of a wetting agent or addition of undesirable substances to the electrolyte system. In a preferred embodiment, a particularly advantageous electrolyte solvent system (propylene carbonate and ethylene carbonate) is used with excellent charge and discharge rates and excellent cycle life.

17 Claims, 2 Drawing Sheets

NONAQUEOUS BATTERY WITH SPECIAL SEPARATOR

TECHNICAL FIELD

The invention is a lithium nonaqueous battery incorporating unique separator material.

BACKGROUND OF THE INVENTION

The rapid increase in technology, particularly technology directed toward consumer use and the emphasis on portability and light weight in consumer electronic equipment has increased the demand for reliable, light weight, high energy power sources. Such demand is found in a variety of technologies such as power tools, calculators, computers, cordless telephones, garden tools, as well as back-up power sources in computer technology and memory devices.

Lithium nonaqueous cells have long been known and attractive commercially for a variety of reasons including their known high energy density and long shelf-life. Primary lithium nonaqueous cells are used commercially in a variety of applications where high energy density and long shelf life are at a premium. Typical applications are power sources for watches, calculators, pacemakers, rockets, etc.

Particularly desirable for a variety of applications is a secondary lithium nonaqueous battery which retains the advantages of primary lithium cells but can be cycled a large number of times. The range of applications of such a rechargeable lithium nonaqueous cell is enormous and includes, for example, power sources for cordless telephones, portable computers, portable garden tools, portable drills, etc.

Much progress has been made in devising a suitable rechargeable lithium nonaqueous cell. For example, a number of cathode materials have been discovered which have excellent capacities, have good recycling properties and are very compatible with lithium anode material. Particularly noteworthy among these cathode materials are the transition-metal chalcogenides (e.g., $NbSe_3$); see, for example, U.S. Pat. 3,864,167 issued to J. Broadhead et al. on Feb. 4, 1975.

A nonaqueous cell is generally made up of positive and negative electrodes separated by an insulating material called a separator which prevents electrical contact between positive and negative electrodes, but allows ionic conduction between these electrodes. The separator is usually made of a polymer material (e.g., polyethylene, polypropylene, etc.) made in the form of a microporous film. Typical commercial products are Celgard ®2400 and Celgard ®2402 made by the Celanese Corporation.

Separator materials play an important part in lithium rechargeable battery operation. The separator material must be stable to the conditions of the battery so as not to degrade and allow direct electrical contact between positive and negative electrodes. This is particularly difficult in a lithium nonaqueous battery because of the high reactivity of the materials involved and the high electropotentials involved. The separator material should also be highly insulating to prevent current leakage between positive and negative electrodes and remain highly insulating throughout the life of the battery.

In addition, the separator material must permit high ionic conductivity between positive and negative electrodes so that the cell exhibits high charge and discharge rates. Such high ionic conductivity requires that the separator material be "wetted" by the electrolyte system, but electrolyte systems for lithium nonaqueous batteries are typically highly inert chemically and do not easily "wet" the separator material. Typically, a wetting agent in the form of a surfactant is added to the separator, such as silicon glycol or imidazole, but such agents react with various materials in the cell (probably lithium) and limit the cycle life of the battery. Another solution is to incorporate various substances with low surface tension in the electrolyte (e.g., furans, other ethers, etc.), but these substances also are not as stable as might be desired and might limit the cycle life of the battery.

It is highly desirable to wet the separator material without adding undesirable material to the electrolyte system. Under these circumstances, excellent, inert, long lasting electrolyte systems can be used without degrading charge and discharge current rates.

A number of references have described electrolyte systems for lithium, nonaqueous batteries. (See, for example, a paper by S. I. Tobishima et al., entitled "Ethylene Carbonate/Ether Mixed Solvents Electrolyte for Lithium Batteries", published in *Electrochimica Acta* 29, No. 10, pp. 1471–1476 (1984) and S. I. Tobishima et al., "Ethylene Carbonate-Propylene Carbonate Mixed Electrolytes for Lithium Batteries", *Electrochimica Acta* 29, No. 2, pp. 267–271 (1984).) Also of interest is a paper by G. Pistoia entitled "Nonaqueous Batteries with $LiClO_4$-Ethylene Carbonate as Electrolyte, *Journal of the Electrochemical Society* 118, No. 1, pp. 153–158 (1971).

Gamma-ray grafting is a well known technique in polymer chemistry. Indeed, it is used extensively in the production of a variety of articles and is the subject matter of various chapters and books (See, for example, *Radiation Chemistry of Polymeric Systems*, by A. Chapiro, Interscience, New York, 1962, especially chapter XII, and *Atomic Radiation and Polymers*, by A. Charlesby, Pergamon Press, New York, 1960).

In aqueous batteries such as alkaline zinc batteries, various grafted separators have been used to promote separator wettability and ionic conduction. Typical references are as follows: "Modifying Membrane Properties to Meet Industrial Needs" by V. D'Agostino et al, *Extended Abstracts*, 158th Meeting of the Electrochemical Society, Hollywood, Fla., Oct. 5–10, 1980, pp. 1535–1536; a paper by R. S. Yeo and J. Lee entitled "Novel Hybrid Separators for Alkaline Zinc Batteries", *Proceedings of the Symposium on Advances in Battery Materials and Processes*, Ed. by J. McBreen, D. T. Chin, R. S. Yeo and A. C. C. Tseung, *The Electrochemcial Society Proceedings*, Volume 84-4, pp. 206–217; and V. D'Agostino et al, "Manufacturing Methods for High Performance Grafted Polyethylene Battery Separators", AFML-TR-72-13, May 1972.

SUMMARY OF THE INVENTION

Figure 1:
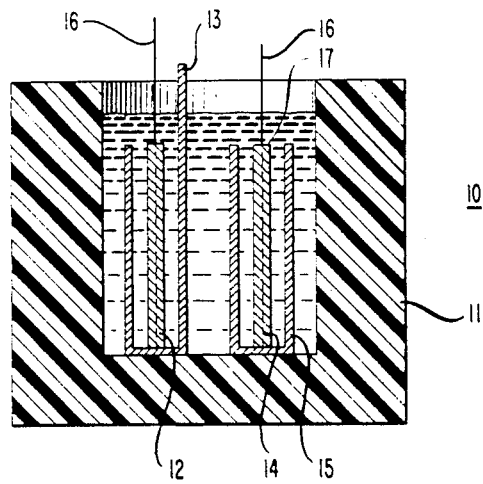
FIG. 1 shows a rectangular, nonaqueous cell featuring positive electrode, negative electrode, and grafted separator material.

The invention is a lithium nonaqueous cell comprising positive electrode, negative electrode, electrolyte and separator in which the separator material is composed of a γ-ray grafted microporous polyethylene or polypropylene material. The nature of the separator material is of paramount importance. The separator is made from conventional microporous separator material in which certain functional groups have been radiation-grafted onto the separator material. Particularly useful is polypropylene separator material (e.g., Celgard ® made by Celanese Corporation) in which γ-ray grafting has been carried out on the separator material. Various positive and negative electrode materials may be used in the practice of the invention including lithium metal for the negative electrode and various transition-metal chalcogenides (e.g., $NbSe_3$) for the positive electrodes. Various electrolyte systems are useful in the practice of the invention including mixtures of propylene carbonate and ethylene carbonate with one or more lithium salts dissolved in the mixture.

DETAILED DESCRIPTION

The invention is based on the discovery that the ionic conductivity through a separator material suitable for use in nonaqueous cells can be increased enormously by subjecting the separator material to a γ-ray grafting procedure with a monomer suitable for use in nonaqueous lithium cells and useful in promoting wetting of the separator material with the electrolyte. A variety of grafting procedures may be used in the practice of the invention. Various kinds of separator materials may be used and subjected to the grafting process.

The preferred separator material is a microporous polypropylene, typically hydrophobic with nominal thickness of about one mil, porosity of 38 percent and effective pore size of 0.08 microns. Often, a two-ply form of this material is used. Various other kinds of separator materials may also be used in the practice of the invention including other microporous polypropylene and polyethylene films and fibers.

The grafting procedure is not critical in the practice of the invention. Generally, the radiation-grafting procedure is designed to promote maximum (or at least predominant) grafting as opposed to crosslinking. Generally, this means lower radiation levels. Generally, high energy γ-radiation is used because it causes cleavage of carbon-hydrogen bands of the polymer and yields a highly reactive free radical in the process. Olefinic type monomers are preferred because the grafting process occurs preferentially under these conditions. Also, the radiation dosage is usually much lower than for crosslinking so as to promote predominantly the grafting process.

In a typical procedure, the microporous separator sheet is soaked in a monomer solution. More than one monomer may be used in the solution and often more than one solvent species is used. Use of a chain transfer agent is optional. Exemplatory monomers are methacrylic acid and vinyl pyrrolidone. Typical solvents are benzene, carbon tetrachloride, and methanol. Structural formulas for the exemplatory monomers are as follows:

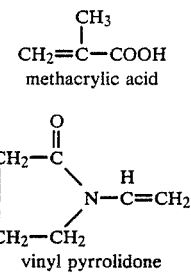

methacrylic acid vinyl pyrrolidone

Various procedures may be used to effect the desired grafting on the microporous separators. A typical procedure is as follows: A solution is made up of monomers in a solvent. The microporous separator material is usually rolled up in a container and the monomer solution poured in the container. Often, the separator material is left to soak in the solution for a time (e.g., one or two days) and then the solution and separator material exposed to a γ-radiation source (e.g., a cobalt 60 radiation source) for a predetermined time and at a predetermined radiation level. Typical radiation levels are 1000–20,000 rads/hour and typical times are one hour to 10 days.

The resulting grafted microporous separator material has active organic groups attached to the polymer structure. The material is characterized by measuring the conductivity in an electrolyte composed of 1.0M $LiAsF_6$ in propylene carbonate, with the separator material positioned between the electrodes. Conductivity through untreated microporous polypropylene separator material is very low whereas through treated separator material the conductivity is high.

This data is summarized in Table I. Untreated separator material has an extremely high resistance due to the fact that the electrolyte does not "wet" the separator material.

| PHYSICAL PROPERTIES OF RADIATION GRAFTED SEPARATOR MATERIALS | | | | | |
|---|---|---|---|---|---|
| SEPARATOR MATERIAL | FUNCTIONAL GROUP | THICKNESS (MIL) | RESIST.* (Ω-IN²) | AV PORE SIZE, Å | POROSITY (%) |
| 1. Untreated Polypropylene | — | 2 | OFF SCALE | 238 | 39 |
| 2. Grafted Polypropylene | Vinyl Pyrrolidone | 2 | 2.9 | 216 | 39 |
| 3. Grafted Polypropylene | Vinyl Pyrrolidone | 1 | 1.5 | 180 | 38 |
| 4. Grafted Polypropylene | Methacrylic Acid | 2 | 4.1 | 235 | 44 |
| 5. Grafted Polypropylene | Methacrylic Acid | 1 | 2.5 | 220 | 38 |

*1.0 M $LiAsF_6$ In Propylene Carbonate At Room Temperature.

In contrast, separator material treated as described above has much lower resistance, showing evidence that the separator material is wetted by the electrolyte. This data also shows that the treated separator material in the electrolyte has high ionic conductivity as is desirable in battery applications.

The grafted separator material may be used advantageously in a variety of nonaqueous battery structures.

A typical rectangular structure is shown in FIG. 1. This figure shows a cross-section of a test cell structure 10 with plastic (polypropylene) holder 11, lithium negative electrode 12 with separator 13, and NbSe$_3$ positive electrode 14 with inert spacer material 15 to ensure a close fit in the cell holder 11. Metal wires 16 are used to conduct electrical energy out of the cell. The electrodes are covered with electrolyte 17 in accordance with the invention. Such structures are useful for commercial cells as well as test structures for evaluating various aspects of the cell structure, separator grafting procedure, and electrolyte composition.

Figure 2:
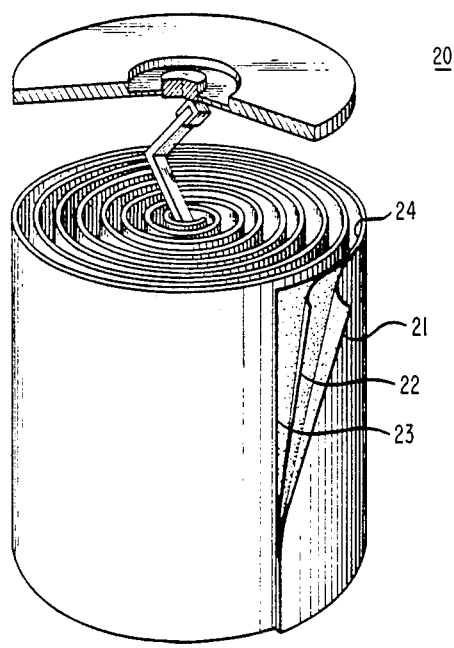
FIG. 2 shows a cylindrical, nonaqueous cell featuring positive electrode, negative electrode, and grafted separator material.

FIG. 2 shows another cell structure 20 useful in the practice of the invention. This cell structure is often called the rolled cylindrical cell structure. Four layers are put together and rolled into a cylindrical shape. The four layers are the negative lithium electrode 21, the separator 22, the positive electrode 23 (e.g., NbSe$_3$), and another separator layer 24. The roll is generally put into a cylindrical container with suitable electrical connections to positive and negative electrodes. The cylindrical container is filled with electrolyte to permit electrochemical action.

Although a variety of materials can be used as the active material in the negative electrode, lithium is preferred because of its high electrochemical potential. Also, a large variety of materials can be used as the active material in the positive electrode, including transition-metal chalcogenides. Particularly useful are a number of positive electrode materials such as NbSe$_2$, NbSe$_3$, MoS$_2$, MoS$_3$, TiS$_2$, TiS$_3$, TaS$_2$, V$_6$O$_{13}$ (stoichiometric and nonstoichiometric), CoO$_2$, and MoO$_2$. Generally, it is desirable to use positive electrodes with high cycle life, high energy density, etc. Particularly useful for these reasons are positive electrodes made from NbSe$_3$. This positive electrode, including procedures for preparation, is shown in U.S. Pat. No. 3,864,167, issued to J. Broadhead et al on Feb. 4, 1975.

Various electrolyte systems may also be used in the practice of the invention. Indeed, a particular advantage of the invention is the greater flexibility in choosing materials for the electrolyte system. The reason for this is that a substance need not be included to insure wetting of the separator and a more stable electrolyte system may be used. Particularly useful are mixtures of propylene carbonate and ethylene carbonate plus a suitable current carrying salt (usually a soluble lithium salt).

Good results are obtained with a mixed solvent made up of between 10 and 90 weight percent ethylene carbonate, remainder propylene carbonate. More preferred is 10 to 50 weight percent ethylene carbonate, remainder propylene carbonate, and most preferred is 25 to 35 weight percent ethylene carbonate, remainder propylene carbonate. These compositions are preferred because it gives maximum liquid temperature ranges with reasonable improvement in conductivity due to ethylene carbonate.

Current-carrying species are also contained in the mixed solvent system to form the electrolyte. Generally, such species are salts which dissolve and ionize (to some extent) in the cosolvent. Lithium salts are preferred because of compatibility with the chemistry of the lithium electrode. Typical salts are LiPF$_6$, LiAsF$_6$, LiClO$_4$, LiCF$_3$SO$_3$, LiBF$_4$, LiAlCl$_4$, LiI, LiF, and LiBr, with LiPF$_6$ and LiAsF$_6$ preferred, and LiAsF$_6$ most preferred from an operational point of view, but LiPF$_6$ is preferred where the arsenate is precluded from use for environmental considerations. Under certain conditions, more than one salt might be used advantageously. The concentration of the current-carrying species may vary over large limits; typically from 0.1 molar to saturation. Preferred is a concentration between 0.5 and 1.5 molar for many lithium salts or more advantageously 0.7 to 1.0M. Too low a concentration limits electrolyte conductivity and often limits cycle life because of salt decomposition. Too high a concentration also limits electrolyte conductivity especially at low temperatures, probably because of association of the ions.

Figure 3:
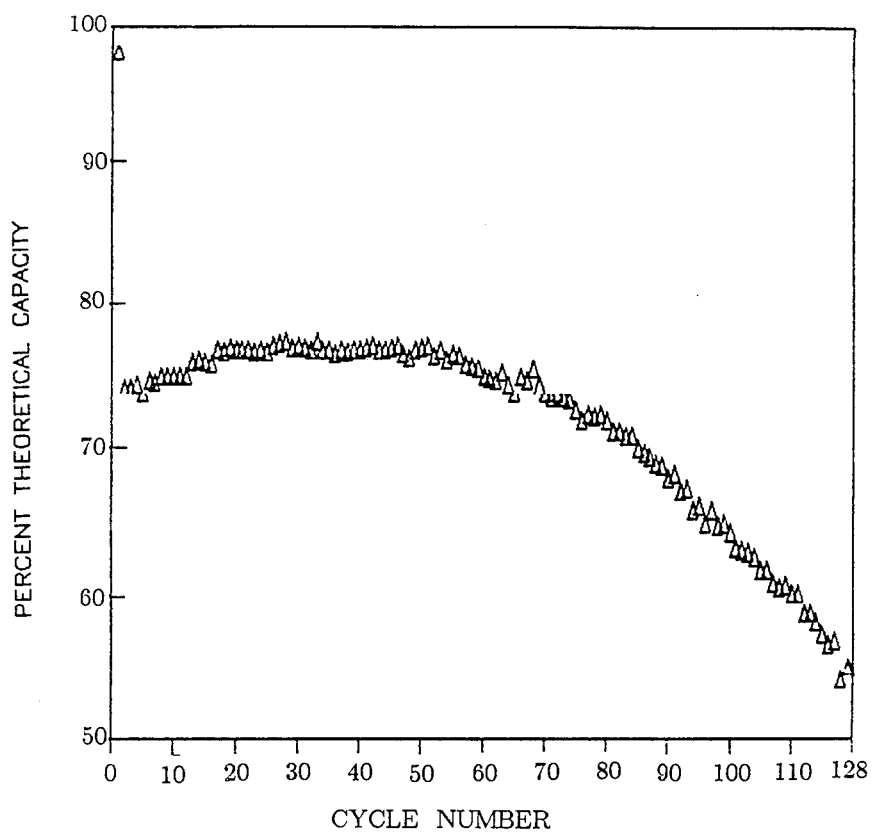
FIG. 3 shows data in graphical form on cycle life of a nonaqueous battery made in accordance with the invention.

A particularly important aspect of the invention is the cycle behavior of the inventive cell. Data was obtained showing the cycle behavior of a cell containing a lithium negative electrode, a NbSe$_3$ positive electrode, a one mil thick microporous polypropylene separator with grafted monomer, and an electrolyte of 0.8M LiAsF$_6$ dissolved in 50 weight percent ethylene carbonate, 50 weight percent propylene carbonate. The discharge rate was c/2 (1.5 mA/cm$^2$) and the charging rate was c/10. The monomer used in the grafting procedure was methacrylic acid. The results are shown in FIG. 3 where Percent Theoretical Capacity is plotted against Cycle Number. The extremely good cycle behavior is due in part to the grafted separator and the favorable electrolyte system that can be used with grafted separator material.

Figure 4:
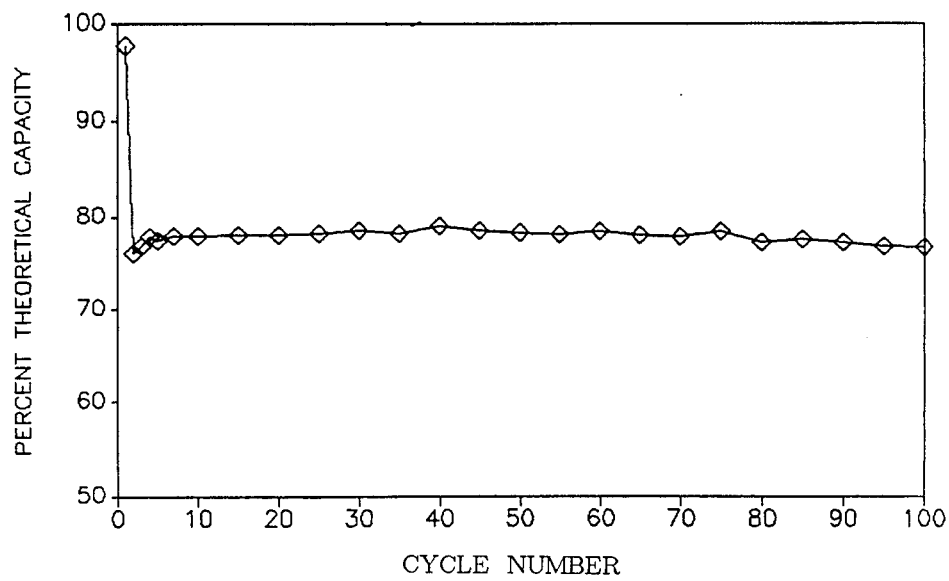
FIG. 4 shows data in graphical form on the cycle life of a nonaqueous battery made in accordance with the invention.

FIG. 4 shows further data on a cell using grafted separator material. The cell was much like the one used to obtain the data in FIG. 3 except the electrolyte was made up of 0.8M LiAsF$_6$ in 70 weight percent propylene carbonate, 30 weight percent ethylene carbonate. Here, the cycle behavior is extremely good, showing a practically constant capacity over many cycles.

Similar cycle-life results are obtained with vinyl pyrrolidone used as the monomer. In one such experiment, over 50 cycles are obtained.

Other monomers are also useful in the practice of the invention. Particular examples are acrylic acid, vinyl pyridine, γ-butyrolactone and 1-methyl-2-pyrrolidone.

Both rectangular and cylindrical cells can be made using the grafted separator material as well as other types of nonaqueous cells.

What is claimed is:

1. A nonaqueous secondary battery comprising a lithium negative electrode, a positive electrode with positive electrode active material, separator material, and electrolyte; characterized in that the separator material comprises microporous polypropylene radiation grafted with an olefinic monomer.

2. The battery of claim 1 in which the microporous polypropylene is γ-radiation grafted with an olefinic monomer selected from the group consisting of methacrylic acid, acrylic acid, vinyl pyridine, vinyl pyrrolidone, 1-methyl-2-pyrrolidone and γ-butyrolactone.

3. The battery of claim 2 in which the monomer is selected from the group consisting of vinyl pyrrolidone and methacrylic acid.

4. The battery of claim 1 in which the monomer is methacrylic acid.

5. The battery of claim 1 in which the electrolyte comprises lithium salt, 10-90 weight percent ethylene carbonate, remainder propylene carbonate.

6. The battery of claim 5 in which the electrolyte comprises 10-50 weight percent ethylene carbonate, remainder propylene carbonate.

7. The battery of claim 6 in which the electrolyte comprises 25-35 weight percent ethylene carbonate, remainder propylene carbonate.

8. The battery of claim 5 in which the concentration of lithium salt is between 0.1M and saturation.

9. The battery of claim 8 in which the concentration of lithium salt is between 0.5 and 1.5M.

10. The battery of claim 9 in which the concentration of lithium salt is between 0.7 and 1.0M.

11. The battery of claim 1 in which the lithium salt is selected from the group consisting of $LiPF_6$, $LiAsF_6$, $LiClO_4$, $LiCF_3SO_3$, $LiBF_4$, $LiAlCl_4$, $LiI$, $LiF$, and $LiBr$.

12. The battery of claim 8 in which the lithium salt is selected from the group consisting of $LiPF_6$ and $LiAsF_6$.

13. The battery of claim 9 in which the lithium salt is $LiAsF_6$.

14. The battery of claim 1 in which the active material of the positive electrode is at least one compound selected from the group consisting of $NbSe_2$, $NbSe_3$, $MoS_2$, $MoS_3$, $TiS_2$, $TiS_3$, $TaS_2$, $V_6O_{13}$ (stoichiometric and nonstoichiometric), $CoO_2$, and $MoO_2$.

15. The battery of claim 14 in which the active material of the positive electrode is $NbSe_3$.

16. The battery of claim 1 in which the electrodes are flat.

17. The battery of claim 1 in which the battery is in the shape of a rolled cylindrical cell.

* * * * *